(12) United States Patent
Grill et al.

(10) Patent No.: US 11,019,095 B2
(45) Date of Patent: May 25, 2021

(54) RANSOMWARE DETECTION USING FILE REPLICATION LOGS

(71) Applicant: Cisco Technology, Inc., San Jose, CA (US)

(72) Inventors: Martin Grill, Pargaue (CZ); Lukas Bajer, Liberec (CZ); Martin Kopp, Beroun (CZ); Jan Kohout, Roudnice Nad Labem (CZ)

(73) Assignee: Cisco Technology, Inc., San Jose, CA (US)

( * ) Notice: Subject to any disclaimer, the term of this patent is extended or adjusted under 35 U.S.C. 154(b) by 298 days.

(21) Appl. No.: 16/261,682

(22) Filed: Jan. 30, 2019

(65) Prior Publication Data

US 2020/0244672 A1 Jul. 30, 2020

(51) Int. Cl.
H04L 29/06 (2006.01)

(52) U.S. Cl.
CPC ........ H04L 63/145 (2013.01); H04L 63/1416 (2013.01); H04L 63/1425 (2013.01); H04L 63/1433 (2013.01)

(58) Field of Classification Search
CPC . H04L 63/14; H04L 63/1416; H04L 63/1425; H04L 63/1433; H04L 63/1441; H04L 63/145
See application file for complete search history.

(56) References Cited

U.S. PATENT DOCUMENTS

| 9,594,881 | B2 | 3/2017 | Bhargava et al. |
| 9,756,061 | B1 | 9/2017 | Roeh et al. |
| 10,021,120 | B1* | 7/2018 | Salour .................. G06F 21/566 |
| 10,229,269 | B1* | 3/2019 | Patton .................. G06F 21/602 |
| 10,409,986 | B1* | 9/2019 | Natanzon ................ G06F 21/56 |
| 2013/0111018 | A1 | 5/2013 | Ammons et al. |
| 2017/0034189 | A1* | 2/2017 | Powell ............... H04L 63/1425 |
| 2018/0048657 | A1* | 2/2018 | Hittel .................... G06F 16/907 |
| 2018/0096143 | A1* | 4/2018 | Xiaoning ............... G06F 21/85 |
| 2018/0114020 | A1* | 4/2018 | Hirschberg ........... G06F 21/566 |
| 2018/0181761 | A1* | 6/2018 | Sinha .................. H04L 63/1433 |
| 2018/0288087 | A1 | 10/2018 | Hittel et al. |
| 2018/0322281 | A1* | 11/2018 | Borlick ................. G06F 21/562 |
| 2019/0205536 | A1* | 7/2019 | Borlick .............. G06F 12/0888 |
| 2019/0235973 | A1* | 8/2019 | Brewer ................ G06F 21/568 |
| 2019/0332769 | A1* | 10/2019 | Fralick ...................... H04L 9/30 |
| 2020/0042703 | A1* | 2/2020 | Herman Saffar ... G06F 11/1435 |

(Continued)

OTHER PUBLICATIONS

Korec, Martin Bc., "Malware Detection Based on Periodic Behavior", Masaryk University Faculty of Informatics Master's Thesis, Spring 2018, 73 pages, Brno, Czech Republic.

(Continued)

*Primary Examiner* — Khang Do
(74) *Attorney, Agent, or Firm* — Behmke Innovation Group LLC; Kenneth J. Heywood; James J. Wong

(57) ABSTRACT

In one embodiment, a device in a network obtains log data regarding replication of files stored on an endpoint client to a file replication service. The device tracks, based on the obtained logs, encryption changes to the files that convert the files from unencrypted files to encrypted files. The device determines that the tracked encryption changes to the files are indicative of a ransomware infection on the endpoint client. The device initiates a mitigation action regarding the ransomware infection.

20 Claims, 8 Drawing Sheets

(56) References Cited

U.S. PATENT DOCUMENTS

2020/0099699 A1* 3/2020 Saad .................. G06F 11/3034
2020/0159624 A1* 5/2020 Malkov ............... G06F 11/1448
2020/0236121 A1* 7/2020 Spurlock ............ G06F 11/1456
2020/0244672 A1* 7/2020 Grill .................... H04L 63/145

OTHER PUBLICATIONS

Drago, Idilio et al., "Inside Dropbox: Understanding Personal Cloud Storage Services", IMC '12, Proceedings of the 2012 Internet Measurement Conference, Nov. 2012, pp. 481-494, Boston, Massachusetts.
Brewer, Ross, "Ransomware Attacks: Detection, Prevention and Cure", Network Security, vol. 2016, Issue 9, Sep. 2016, pp. 5-9.
Scaife, Nolen et al., "CryptoLock (and Drop It): Stopping Ransomware Attacks on User Data", 2016 IEEE 36th International Conference on Distributed Computing Systems, Nara, 2016, pp. 303-312.
Andronio, Nicolo, et al., "HelDroid: Dissecting and Detecting Mobile Ransomware", Bos H., Monrose F., Blanc G. (eds) Research in Attacks, Intrusions, and Defenses. RAID Dec. 2015, Lecture Notes in Computer Science, vol. 9404. Springer, Cham.

* cited by examiner

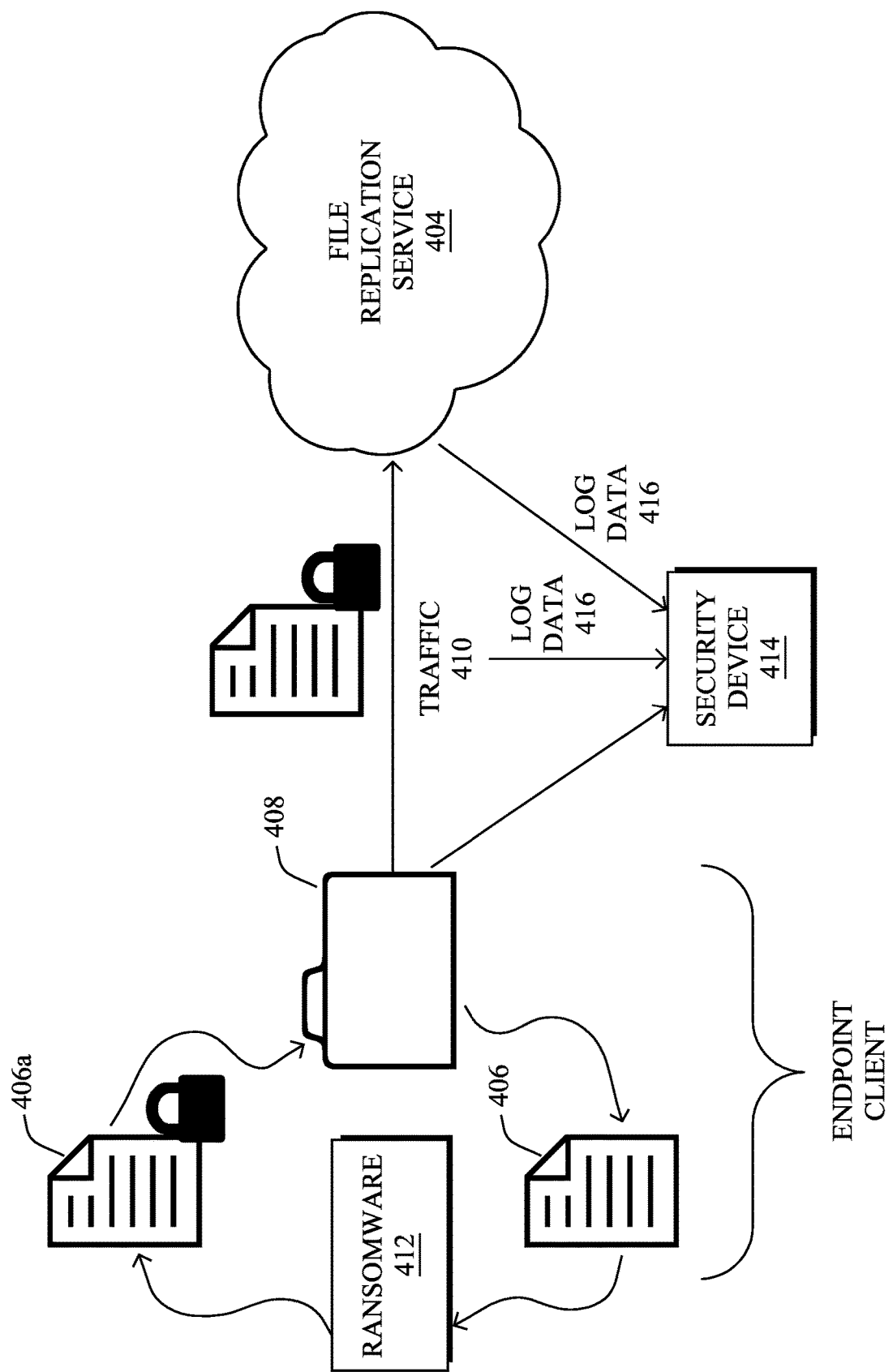

RANSOMWARE DETECTION USING FILE REPLICATION LOGS

TECHNICAL FIELD

The present disclosure relates generally to computer networks, and, more particularly, to the detection of ransomware using file replication logs.

BACKGROUND

Enterprise networks are carrying a very fast growing volume of both business and non-business critical traffic. Beyond the various types of legitimate application traffic in a network, some network traffic may also be malicious. For example, some traffic may seek to exfiltrate sensitive information from a network, such as credit card numbers, trade secrets, and the like. Further types of malicious network traffic include network traffic that propagate the malware itself and network traffic that passes control commands to already-infected devices, such as in the case of a distributed denial of service (DDoS) attack.

One form of malware that is gaining prominence is ransomware, which seeks to prevent a user from accessing his or her data, unless a ransom is paid. More specifically, most ransomware operates by encrypting the files on the hard drive of the local device, thereby preventing the user from accessing the files. To decrypt the files, the user may then be prompted to pay a certain amount of money, typically in the form of crypto-currency, to the originator of the ransomware. Even after paying the ransom, however, there is no guarantee to the user that their files will ever be decrypted. For these reasons, ransomware is considered to be one of the more disruptive and destructive forms of malware today.

While anti-malware programs afford some endpoint protection against ransomware and other forms of malware, there is no guarantee that 1.) the anti-malware program is installed on every endpoint, in a typical network, and 2.) the anti-malware program is capable of stopping new forms of ransomware that may arise.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 4A-4C illustrate examples of the interaction of an endpoint client with a file replication service.

DESCRIPTION OF EXAMPLE EMBODIMENTS

Overview

Figure 1A:
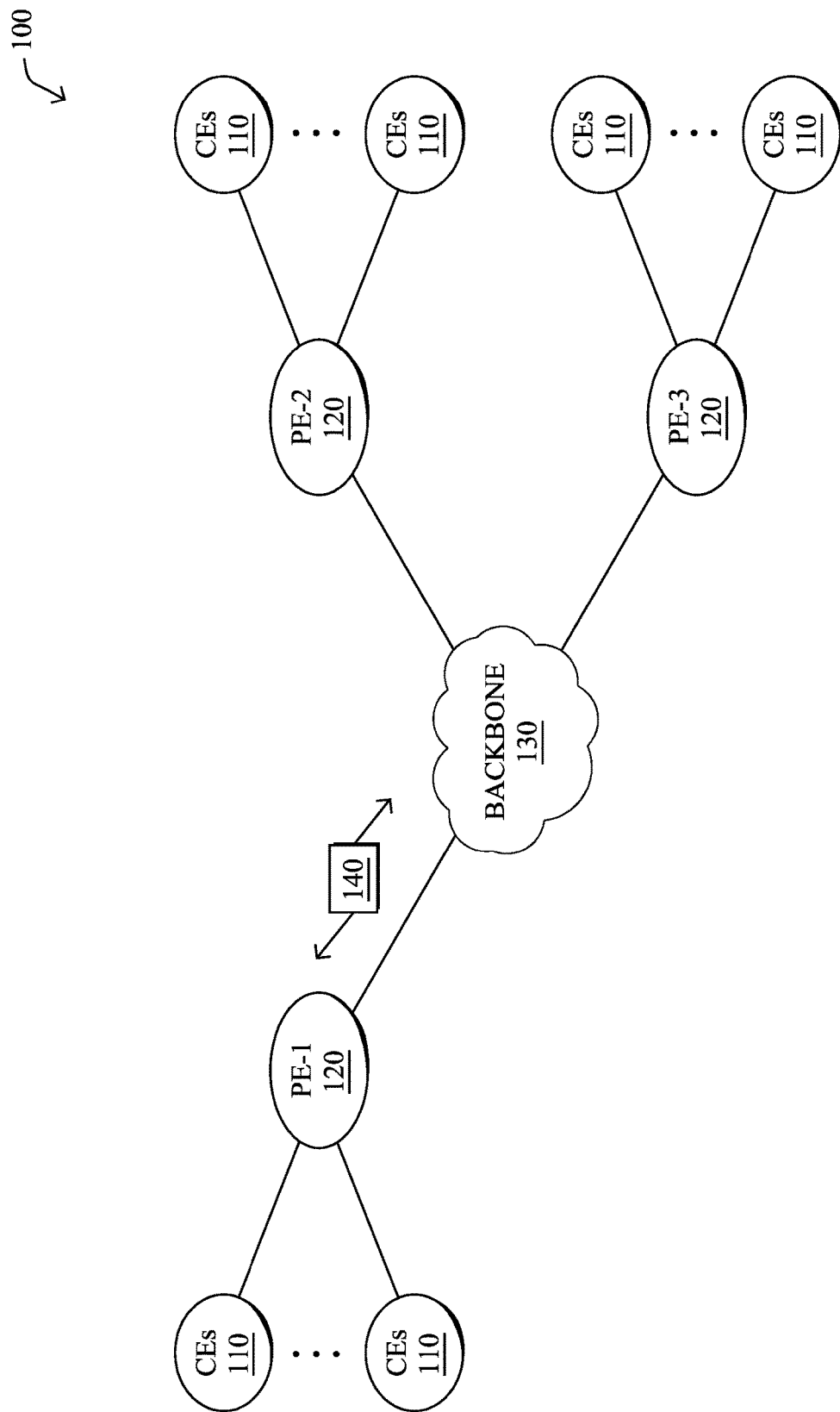
FIGS. 1A-1B illustrate an example communication network.

According to one or more embodiments of the disclosure, a device in a network obtains log data regarding replication of files stored on an endpoint client to a file replication service. The device tracks, based on the obtained logs, encryption changes to the files that convert the files from unencrypted files to encrypted files. The device determines that the tracked encryption changes to the files are indicative of a ransomware infection on the endpoint client. The device initiates a mitigation action regarding the ransomware infection.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
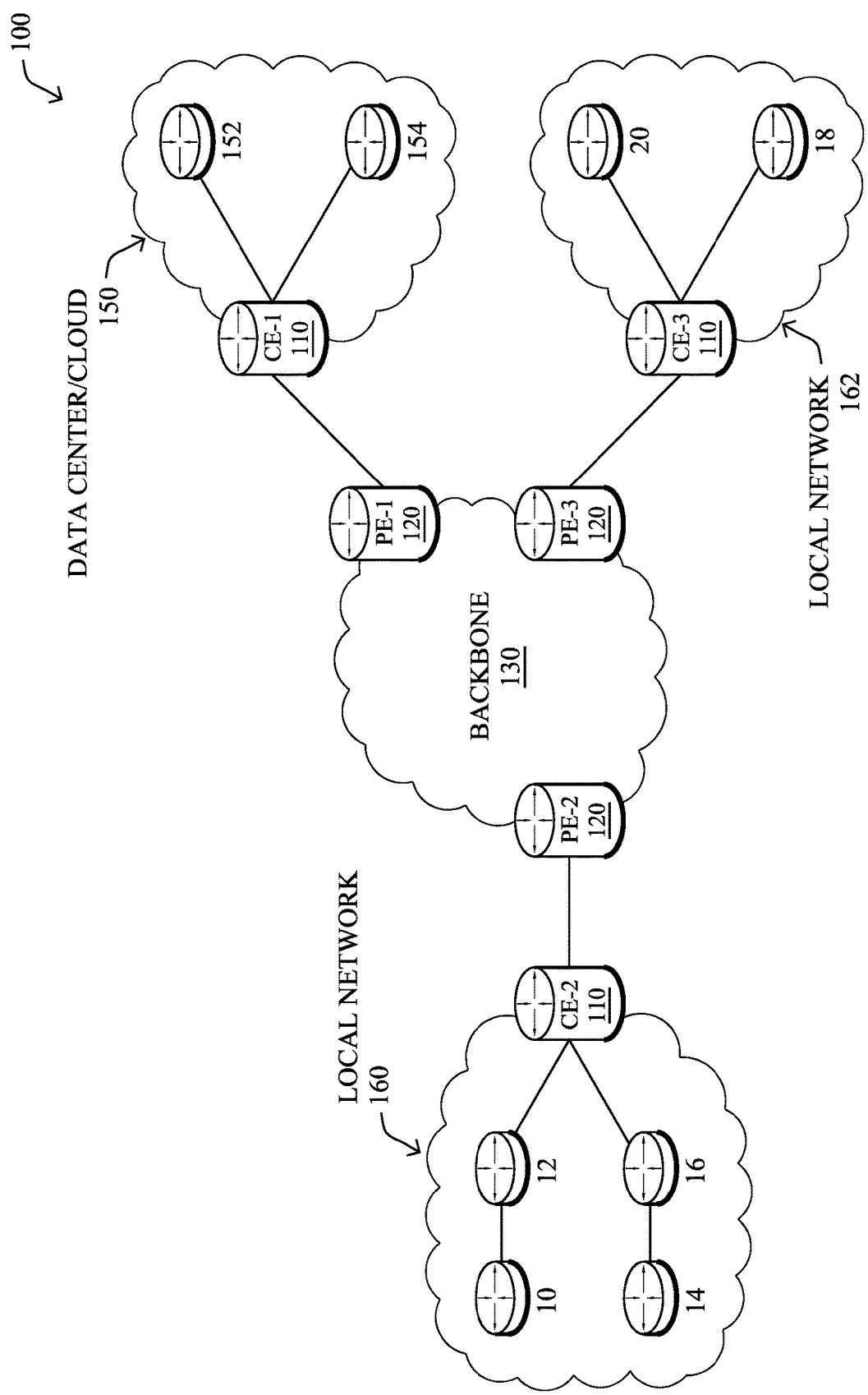

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
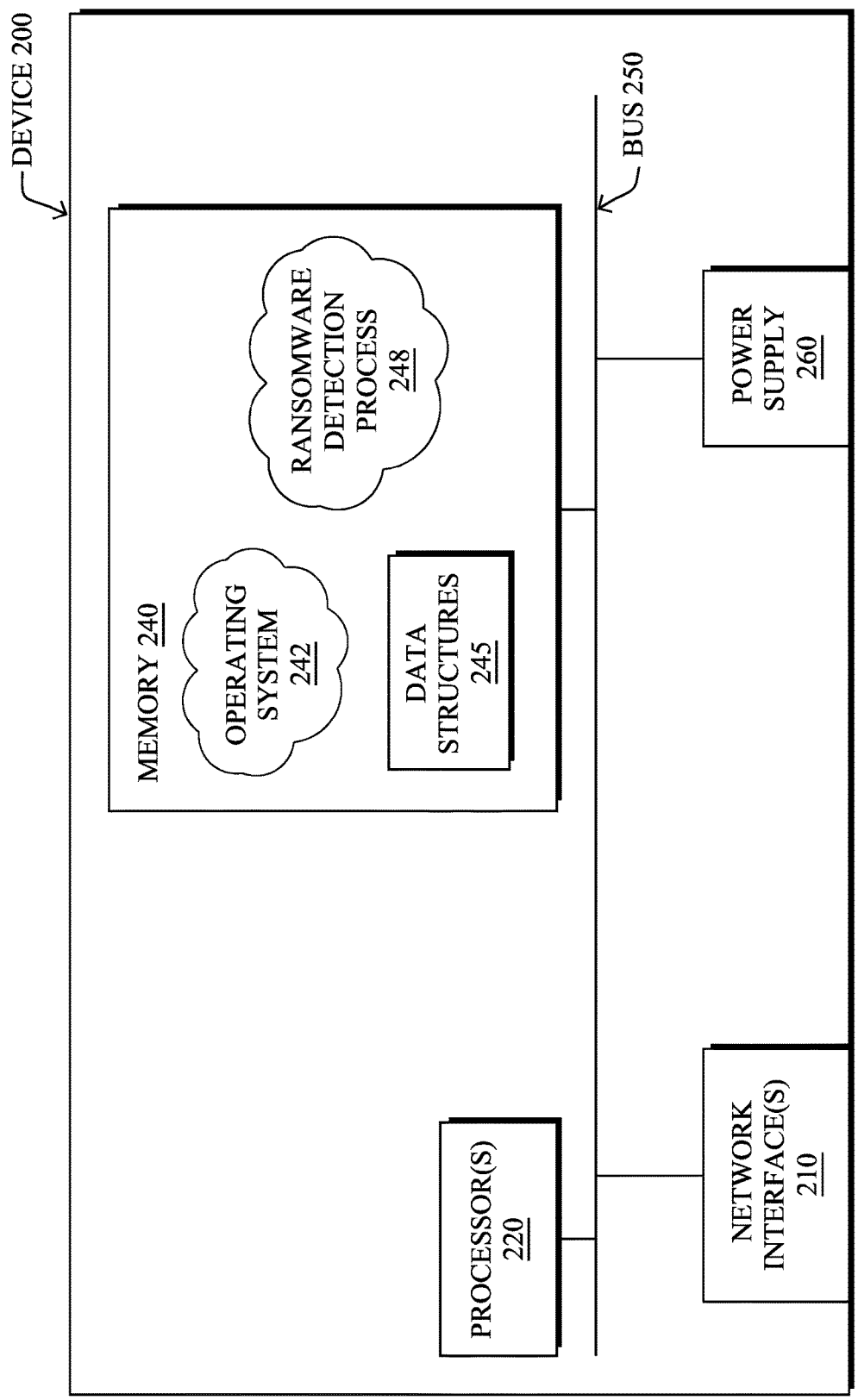
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a ransomware detection process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, ransomware detection process 248 may execute one or more machine learning-based classifiers to classify log data as indicative of a ransomware infection. Alternatively, ransomware detection process 248 may apply heuristics to the log data, for purposes of ransomware detection.

Ransomware detection process 248 may employ any number of machine learning techniques, to classify the obtained log data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a, b, c such that the number of misclassified points is minimal. After this optimization/learning phase, ransomware detection process 248 can use the model M to classify new data points, such as information regarding new log data. Often, M is a statistical model, and the cost function is inversely proportional to the likelihood of M, given the input data.

In various embodiments, ransomware detection process 248 may employ one or more supervised, unsupervised, or semi-supervised machine learning models. Generally, supervised learning entails the use of a training set of data, as noted above, that is used to train the model to apply labels to the input data. For example, the training data may include sample log data that is "normal," or "ransomware-associated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the device and/or its network traffic. Semi-supervised learning models take a middle ground approach that uses a greatly reduced set of labeled training data.

Example machine learning techniques that ransomware detection process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model falsely detected a ransomware infection. Conversely, the false negatives of the model may refer to the number of times the model incorrectly determined there not to be a ransomware infection, when the endpoint was indeed infected. True negatives and positives may refer to the number of times the model correctly determined a behavior as "normal" or "ransomware-associated," respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
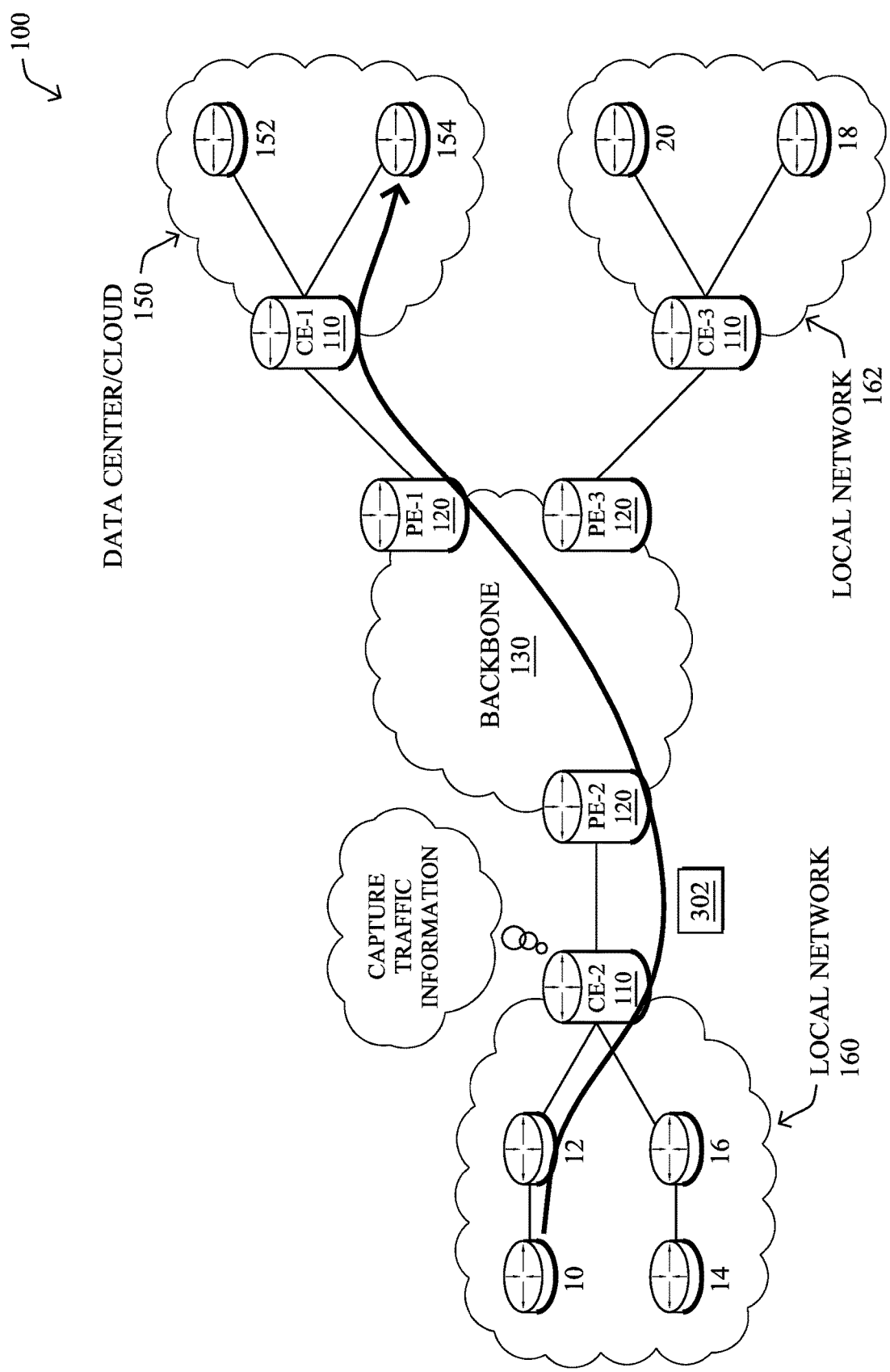
FIG. 3 illustrates the capture of traffic telemetry data in a network.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture log data regarding the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions (e.g., type of encryption used, the encryption key exchange mechanism, the encryption authentication type, etc.), HTTP information (e.g., URI, etc.), Domain Name System (DNS) information, or any other data features that can be extracted from the observed traffic flow(s).

In further embodiments, the device may also assess the payload of the packet to capture log data regarding the traffic flow. For example, router CE-2 or another device may perform deep packet inspection (DPI) on one or more of packets 302, to assess the contents of the packet, provided the packet is unencrypted. Doing so may, for example, yield additional information that can be used to determine the actions being performed, such as writing a file to a remote location, making changes to a file, etc. However, as would be appreciated, a traffic flow may also be encrypted, thus preventing the device from assessing the actual payload of the packet. In such cases, the characteristics of the application can instead be inferred from the captured header information (e.g., through analysis of the protocols in use, the identity of the server, etc.).

The networking device that captures the flow telemetry data may also compute any number of statistics or metrics regarding the traffic flow for inclusion in the captured traffic log data. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, ransomware is a form of malware that uses encryption to scramble important files or series of documents stored on the infected endpoint and, then, demands a ransom to unlock the files for access. Currently, there is no 100% effective defense against this type of attacks. The most common defense is to use a preventive measures so the endpoint does not get infected in the first place, such as by keeping the system patched, with installed and updated antivirus programs, training network users against phishing attacks, etc. If there is visibility into the endpoint, as in the case of Advanced Malware Protection (AMP) by Cisco Systems, another common approach is to monitor the file integrity (e.g., monitoring the number of file renames, file touches, etc.). If only network traffic traces are available, other approaches may try to identify the traffic from/to the command and control (C&C) channel that is necessary for the encryption key to dispatch. However, identifying this traffic is very hard because it is only a one-shot communication of negligible size. Additionally, C&C traffic can be hidden behind a compromised legitimate web site, under different hostname when using domain fronting, in a TOR network, etc.

Ransomware Detection Using File Replication Logs

The techniques herein present simple, yet powerful way how to passively detect ransomware infections in a network. In general, the techniques herein do not focus on the detection of C&C traffic, but instead focus on the side effects of a ransomware infection, such as the mass encryption of files on an endpoint. In further aspects, the techniques herein leverage information about the interactions between an endpoint client and a file replication service, such as a cloud storage service, a document sharing service (e.g., a document management service, or the like, to determine whether the endpoint client is infected with ransomware.

Specifically, according to one or more embodiments of the disclosure as described in detail below, a device in a network obtains log data regarding replication of files stored on an endpoint client to a file replication service. The device tracks, based on the obtained logs, encryption changes to the files that convert the files from unencrypted files to encrypted files. The device determines that the tracked encryption changes to the files are indicative of a ransomware infection on the endpoint client. The device initiates a mitigation action regarding the ransomware infection.

Illustratively, the techniques described herein may be performed by hardware, software, and/or firmware, such as in accordance with the ransomware detection process 248, which may include computer executable instructions executed by the processor 220 (or independent processor of interfaces 210) to perform functions relating to the techniques described herein.

Figure 4A:
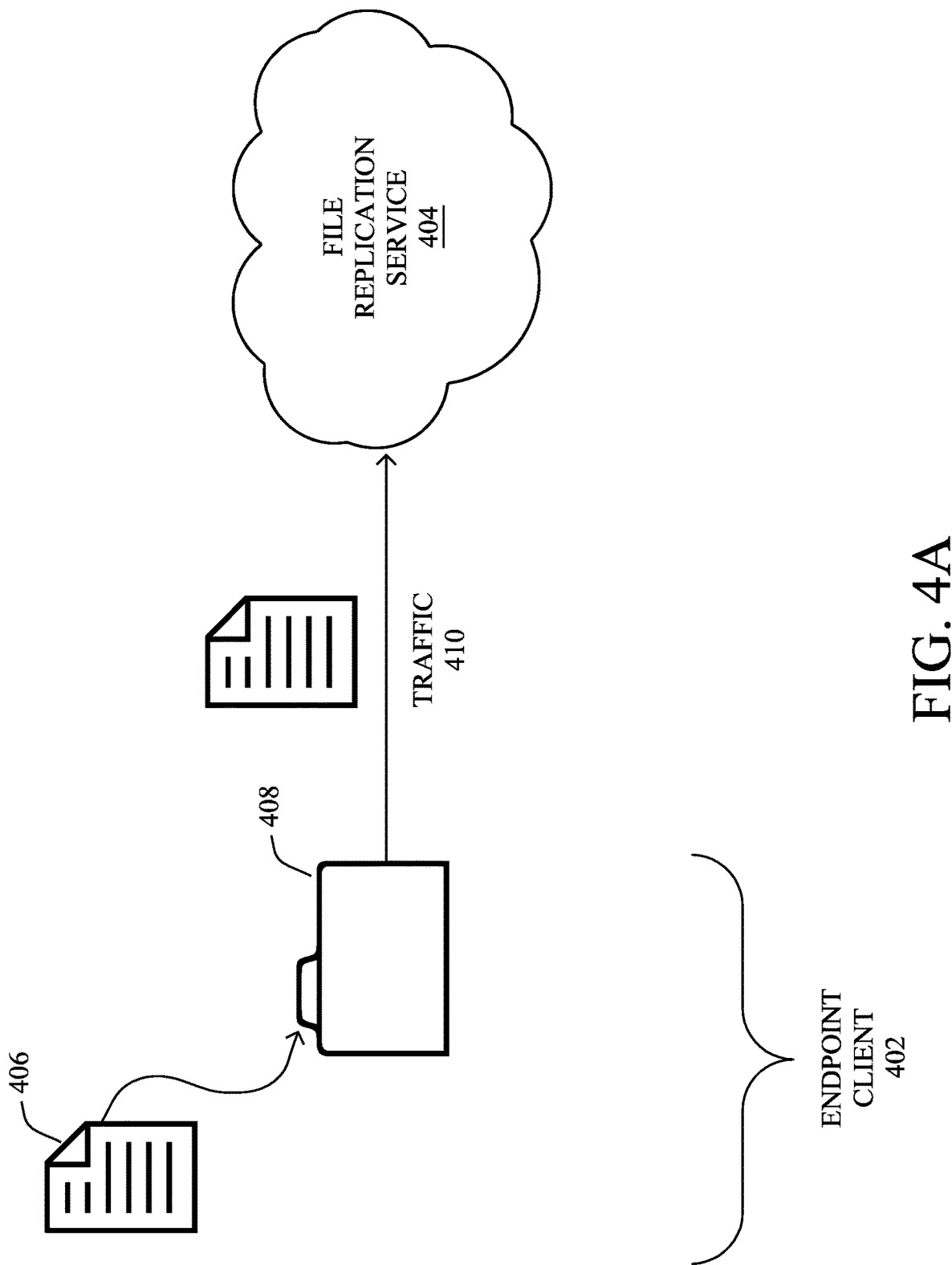
Figure 4B:
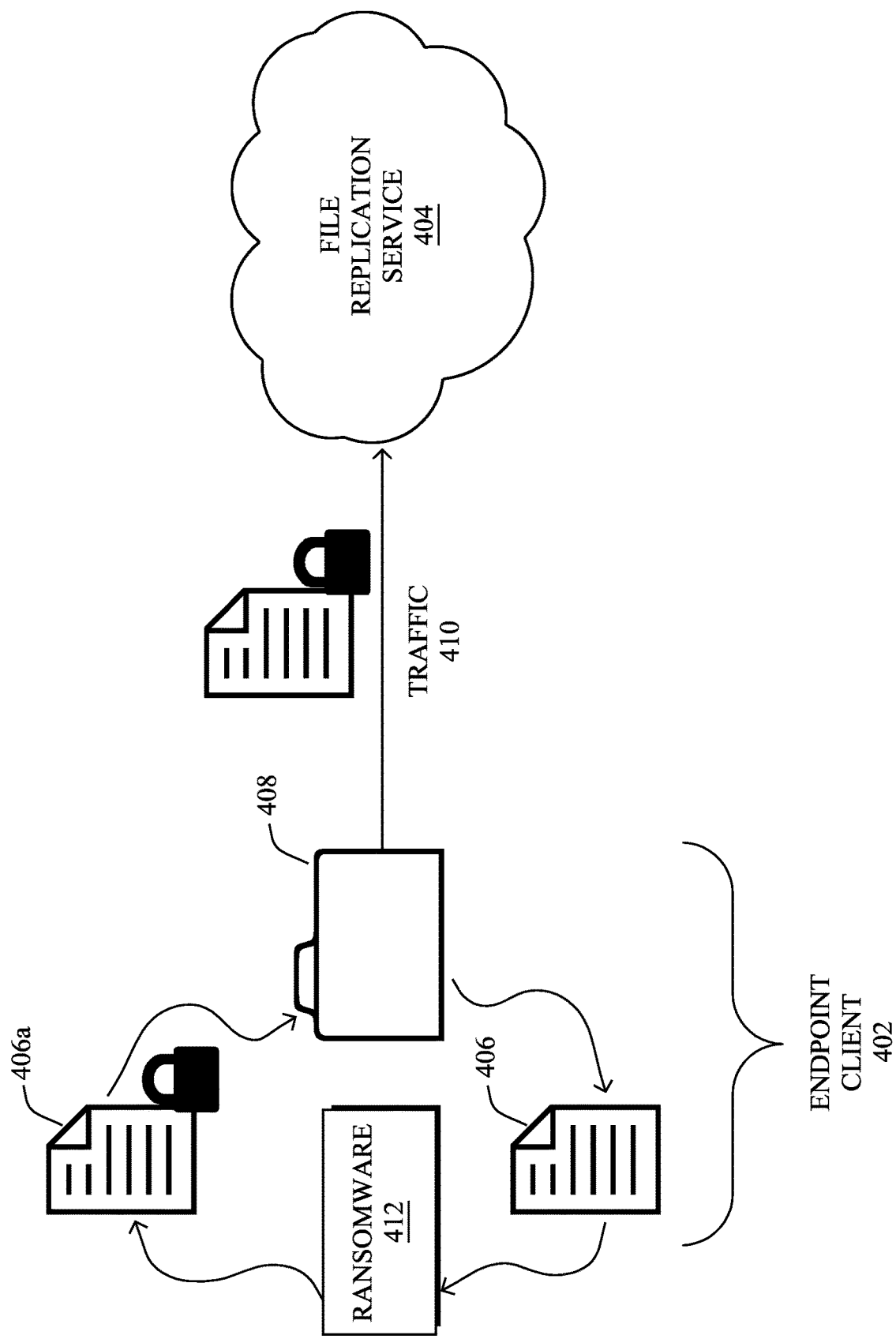

Operationally, FIGS. 4A-4C illustrate examples of the interaction of an endpoint client with a file replication service, according to various embodiments. As shown in FIG. 4A, assume that an endpoint client 402 is in communication with a file replication service 404. Such a service may be a cloud-based file backup or storage service (e.g., Dropbox, iCloud, Google Drive, etc.) or, in some cases, may be a file sharing service, such as a document management service (DMS) or the like.

During operation, endpoint client 402 may send copies of its local files, such as file 406, to file replication service 404 via traffic 410. For example, many cloud backup services function by executing a local agent on the endpoint client that monitors one or more synchronization folder and synchronizing changes made to the file(s) in that folder with those replicated on file replication service 404. Other forms of file replication services may instead require active confirmation by the user of the endpoint client, to replicate a local file to file replication service 404. For example, as shown, assume that folder 408 is a local folder of endpoint client 402 that is associated with file replication service 404. When file 406 is placed into folder 408, the local replication agent on endpoint client 402 may send a copy of file 406 to file replication service 404, thereby replicating a copy of file 406 to file replication service 404.

FIG. 4B illustrates another example of the interactions between endpoint client 402 and file replication service 404, this time with endpoint client 402 being infected with ransomware 412. As would be appreciated, ransomware typically focuses on encrypting sensitive files that are stored in certain folders on the user's device (e.g., the user's personal or documents folder, etc.). Preliminary testing has also revealed that these types of folders also tend to be used for purposes of replicating local files on the endpoint client to a file replication service. For example, during execution, ransomware 412 may encrypt the files in folder 408, such as by encrypting file 406 into encrypted file 406a.

From a perspective external to that of endpoint client 402, the execution of ransomware 412 on endpoint client 402 will leave certain clues as to its infection of endpoint client 402. For example, as shown, the encryption of file 406 into encrypted file 406a by ransomware 412 may cause the local agent associated with folder 408 to replicate the encryption on the synchronized file in file replication service 404. Notably, when ransomware 412 encrypts file 406 into file 406a, the local agent associated with folder 408 may send traffic 410a to file replication service 404, to update the replicated copy of file 406 stored by service 404.

According to various embodiments, as shown in FIG. 4C, a security device 414 (e.g., a device 200 executing ransomware detection process 248) may detect the infection of endpoint client 402 with ransomware 412 through analysis of log data 416 associated with the transaction shown in FIG. 4B. In various embodiments, security device 414 may be local to the network of endpoint client 402, may be an intermediary device between endpoint client 402 and file replication service 404, or may even be a server that is part of endpoint replication service 404. In further embodiments, log data 416 may take on any or all of the following forms:

Traffic log data—as noted above, an intermediary networking device may capture traffic telemetry data regarding traffic 410 and 410a. For example, such log information may be in the form of Netflow, IPFIX, or web access logs that may be captured, e.g., based on the destination address of traffic 410/410a matching that of file replication service 404, the protocol(s) of traffic 410/410a corresponding to that of service 404, or the like. In some cases, the captured traffic log data may include DPI information, if the traffic 410 410a is sent in an unencrypted manner from endpoint client 402. However, if this is not the case and traffic 410/410a is encrypted, the capturing device may still perform DPI after decrypting captured packets from the traffic (e.g., by acting as a man-in-the-middle proxy and using captured keying information to decrypt the packets). In yet another embodiment, the intermediary device may perform analysis on the available packet information (e.g., packet size information, TLS information, etc.), to infer that an encryption change is being made to file 406.

File replication service logs—Another form of log data 416 that may indicate the encryption change to file 406 by ransomware 412 is log data captured by file replication service 404 itself. Notably, traffic 410a may generally signal to file replication service 404 that the previously replicated file 406 is to be replaced or overwritten with its encrypted version, file 406a. In such a case, file replication service 404 may log such a change and, in one embodiment, also store a backup of the unencrypted, replicated version of file 406 previously uploaded to service 404. This form of log data 416 may be provided by file replication service 404 on a push basis to security device 414 or, alternatively, on a pull basis by security device 414, such as through use of an application programming interface (API) of file replication service 404.

Log data from endpoint client 402—A further form of log data 416 may be from a process executed by endpoint client 402. For example, the agent responsible for synchronizing files within folder 408 and file replication service 404 may provide log data 416 to security device 414 regarding the depicted transaction. In another example, an anti-malware agent or other monitoring process may provide log data 416 to security device 414.

Using the obtained log data 416, security device 414 may track the encryption changes to the files of endpoint client 402 and determine whether the file encryption changes are indicative of a ransomware infection on endpoint client 402. In various embodiments, security device 414 may determine that endpoint client 402 is infected with ransomware based on the number of replicated files being encrypted, a rate of the files being encrypted, an amount of traffic being sent to file replication service 404, or the like. In a further embodiment, security device 414 may also take into account the file names and/or file extensions of the encrypted files. Notably, many forms of ransomware will use a specialized naming convention during the encryption process.

When security device 414 determines that endpoint client 402 is infected with ransomware 412, it may initiate any number of mitigation actions. In one embodiment, security device 414 may cause file replication service 404 to retain unencrypted versions of the files replicated from endpoint client 402, so as to provide a backup of the now-encrypted files. In another embodiment, security device 414 may signal to an anti-malware agent on endpoint client 402 to lock the files on endpoint client 402 from further changes, thereby preventing ransomware 412 from encrypting any additional files. A further mitigation action may entail security device 414 sending an alert to a user interface, such as that of the user of endpoint client 402, an administrator of the network in which endpoint client 402 is located, or that of another interested party. Note that these mitigation actions can also be performed in conjunction with one another (e.g., blocking further file changes on client 402, alerting the user as to the infection, and causing service 404 to retain backup copies of the unencrypted files until the infection has been removed).

Figure 5:
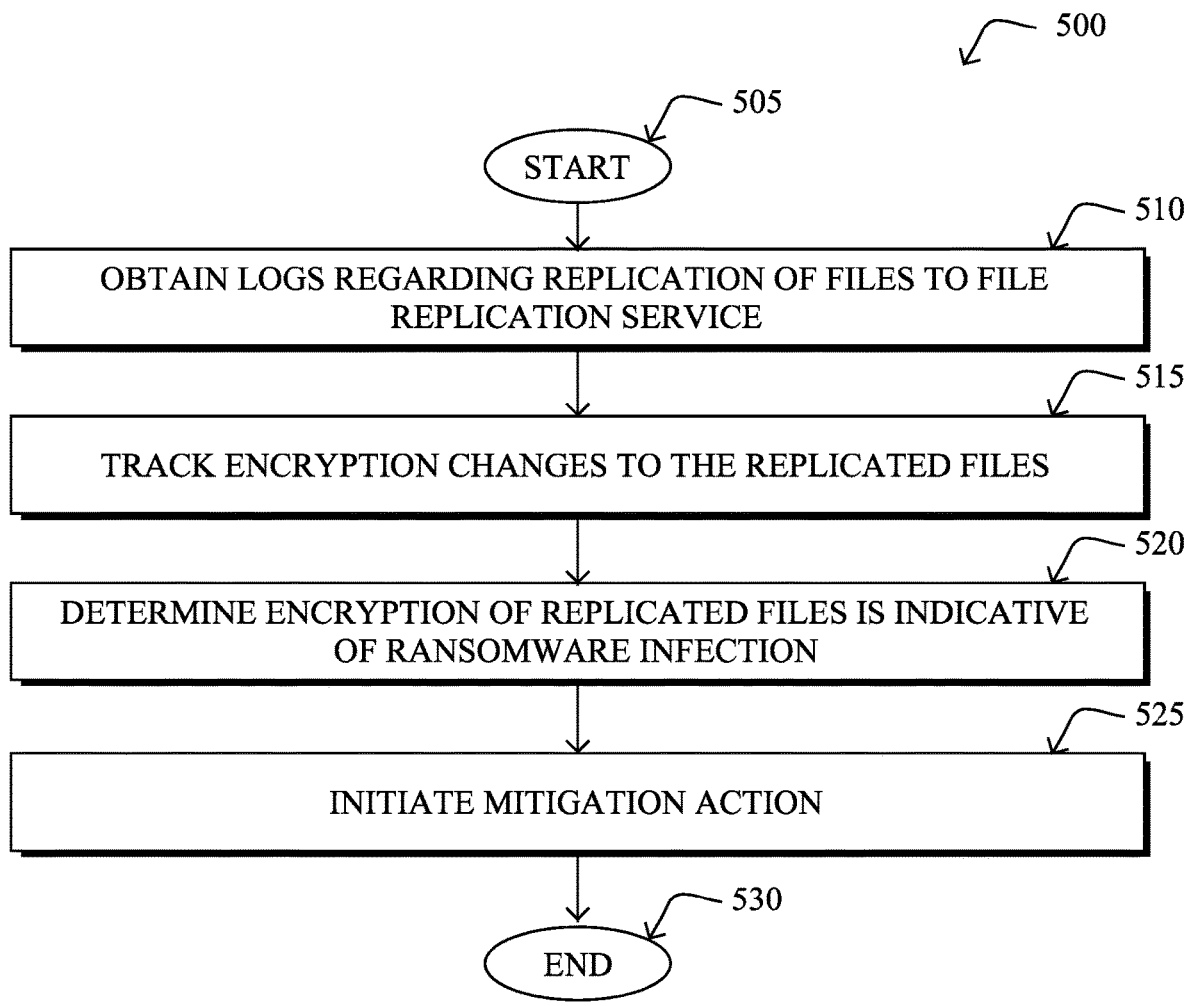
FIG. 5 illustrates an example simplified procedure for detecting a ransomware infection.

FIG. 5 illustrates an example simplified procedure 500 for detecting a ransomware infection, in accordance with one or more embodiments described herein. For example, a non-generic, specifically configured device (e.g., device 200) may perform procedure 500 by executing stored instructions (e.g., process 248). The procedure 500 may start at step 505, and continues to step 510, where, as described in greater detail above, the device may obtain log data regarding replication of files stored on an endpoint client to a file replication service. For example, the file replication service may be a cloud service that provides for automated backup of files stored on the endpoint client and/or may allow for sharing of the files with other clients (e.g., a document management service, etc.). In some embodiments, the device may be a server that provides the file replication service to the endpoint client. The device may obtain the log data in any number of ways, such as by obtaining the log data via an API associated with the file replication service (e.g., either from the client or the service), obtaining traffic log data regarding network traffic between the endpoint client and the file replication service, and/or obtaining the log data from a monitoring agent executed by the client.

At step 515, as detailed above, the device may track, based on the obtained logs, encryption changes to the files that convert the files from unencrypted files to encrypted files. For example, if a file previously replicated from the client to the file replication service is to be replaced with an encrypted version of that file, the device may flag such an encryption change from the resulting log data that the device obtained.

At step 520, the device may determine that the tracked encryption changes to the files are indicative of a ransomware infection on the endpoint client, as described in greater detail above. For example, the device may compute the number or rate of files being encrypted on the endpoint client and, based on the computed value(s), determine that the endpoint client is infected with ransomware. This comparison may be based on heuristics (e.g., by comparing the number or rate to one or more thresholds) or, in further embodiments, may be aided through the use of a machine learning-based model. For example, the device may also leverage a model that has been trained to discern between files being encrypted by a user and those being encrypted by ransomware.

At step 520, as detailed above, the device may initiate a mitigation action regarding the ransomware infection. In some embodiments, the mitigation action may comprise reverting the encrypted files to unencrypted versions of the files previously stored by the file replication service. For example, the device may cause the file replication service to retain unencrypted versions of the files so that the files can be restored on the endpoint client. Further mitigation actions may entail sending an alert to a user interface, causing the endpoint client to lock its files from further encryption, or the like. Procedure 500 then ends at step 525.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore allow for the detection of ransomware infections through inspection of file replication logs. In addition, the techniques do not require the protected endpoint client to execute any anti-malware at all, making the process completely transparent from the standpoint of the protected client. Of course, however, the techniques herein can also be used to further enhance the functionality of such endpoint agents (e.g., by signaling to the agent to lock the local files from further encryption).

While there have been shown and described illustrative embodiments that provide for the detection of ransomware infections, it is to be understood that various other adaptations and modifications may be made within the spirit and scope of the embodiments herein. For example, while certain embodiments are described herein with respect to using certain models for purposes of ransomware detection, the models are not limited as such and may be used for other functions, in other embodiments. In addition, while certain protocols are shown, such as TLS, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device in a network, log data regarding replication of files stored on an endpoint client to a file replication service;
   tracking, by the device and based on the obtained logs, encryption changes to the files that convert the files from unencrypted files to encrypted files;
   determining, by the device, that the tracked encryption changes to the files are indicative of a ransomware infection on the endpoint client; and
   initiating, by the device, a mitigation action regarding the ransomware infection.

2. The method as in claim 1, wherein the mitigation action comprises reverting the encrypted files to unencrypted versions of the files previously stored by the file replication service.

3. The method as in claim 1, wherein the mitigation action comprises sending a ransomware detection alert to a user interface.

4. The method as in claim 1, wherein obtaining the log data comprises:
   obtaining the log data via an application programming interface (API) associated with the file replication service.

5. The method as in claim 1, wherein determining that the tracked encryption changes to the files are indicative of a ransomware infection on the endpoint client comprises:
   computing a number or rate of the files converted from unencrypted files to encrypted files; and
   making a determination that the computed number or rate is indicative of a ransomware infection on the endpoint client.

6. The method as in claim 1, wherein obtaining the log data comprises:
   obtaining traffic log data regarding network traffic between the endpoint client and the file replication service.

7. The method as in claim 1, wherein the file replication service is a cloud service, and wherein the device provides the replication service to the endpoint client.

8. The method as in claim 1, wherein the log data is obtained from the file replication service.

9. An apparatus, comprising:
   one or more network interfaces to communicate with a network;
   a processor coupled to the network interfaces and configured to execute one or more processes; and
   a memory configured to store a process executable by the processor, the process when executed configured to:
   obtain log data regarding replication of files stored on an endpoint client to a file replication service;
   track, based on the obtained logs, encryption changes to the files that convert the files from unencrypted files to encrypted files;
   determine that the tracked encryption changes to the files are indicative of ransomware infection on the endpoint client; and
   initiate a mitigation action regarding the ransomware infection.

10. The apparatus as in claim 9, wherein the mitigation action comprises reverting the encrypted files to unencrypted versions of the files previously stored by the file replication service.

11. The apparatus as in claim 9, wherein the mitigation action comprises sending a ransomware detection alert to a user interface.

12. The apparatus as in claim 9, wherein the apparatus obtains the log data by:
   obtaining the log data via an application programming interface (API) associated with the file replication service.

13. The apparatus as in claim 9, wherein the apparatus determines that the tracked encryption changes to the files are indicative of a ransomware infection on the endpoint client by:
   computing a number or rate of the files converted from unencrypted files to encrypted files; and
   making a determination that the computed number or rate is indicative of a ransomware infection on the endpoint client.

14. The apparatus as in claim 9, wherein the apparatus obtains the log data by:
   obtaining traffic log data regarding network traffic between the endpoint client and the file replication service.

15. The apparatus as in claim 9, wherein the file replication service is a cloud service.

16. The apparatus as in claim 9, wherein the log data is obtained from the file replication service.

17. A tangible, non-transitory, computer-readable medium storing program instructions that cause a device in a network to execute a process comprising:
- obtaining, by the device, log data regarding replication of files stored on an endpoint client to a file replication service;
- tracking, by the device and based on the obtained logs, encryption changes to the files that convert the files from unencrypted files to encrypted files;
- determining, by the device, that the tracked encryption changes to the files are indicative of a ransomware infection on the endpoint client; and
- initiating, by the device, a mitigation action regarding the ransomware infection.

18. The computer-readable medium as in claim 17, wherein the mitigation action comprises reverting the encrypted files to unencrypted versions of the files previously stored by the file replication service.

19. The computer-readable medium as in claim 17, wherein determining that the tracked encryption changes to the files are indicative of a ransomware infection on the endpoint client comprises:
- computing a number or rate of the files converted from unencrypted files to encrypted files; and
- making a determination that the computed number or rate is indicative of a ransomware infection on the endpoint client.

20. The computer-readable medium as in claim 17, wherein obtaining the log data comprises:
- obtaining the log data via an application programming interface (API) associated with the file replication service.

* * * * *

UNITED STATES PATENT AND TRADEMARK OFFICE
CERTIFICATE OF CORRECTION

PATENT NO. : 11,019,095 B2
APPLICATION NO. : 16/261682
DATED : May 25, 2021
INVENTOR(S) : Martin Grill Page 1 of 1

It is certified that error appears in the above-identified patent and that said Letters Patent is hereby corrected as shown below:

In the Claims

Column 12, Line 36, Claim 9, please amend as shown:
are indicative of a ransomware infection on the endpoint Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*